United States Patent
Srivastava

(10) Patent No.: US 10,068,298 B2
(45) Date of Patent: Sep. 4, 2018

(54) WEATHER PATTERN BASED ELECTRICAL DEMAND FORECASTING FOR A BUILDING

(71) Applicant: Siemens Corporation, Iselin, NJ (US)

(72) Inventor: Sanjeev Srivastava, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 337 days.

(21) Appl. No.: 14/882,480

(22) Filed: Oct. 14, 2015

(65) Prior Publication Data

US 2016/0246272 A1    Aug. 25, 2016

Related U.S. Application Data

(60) Provisional application No. 62/040,552, filed on Aug. 22, 2014.

(51) Int. Cl.
*G05D 3/12* (2006.01)
*G06Q 50/06* (2012.01)
*G05B 15/02* (2006.01)

(52) U.S. Cl.
CPC ............ *G06Q 50/06* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 6,577,962 B1* | 6/2003 | Afshari | G06Q 10/06 700/291 |
| 9,807,099 B2* | 10/2017 | Matsuoka | H04L 63/102 |
| 2005/0091176 A1* | 4/2005 | Nishiuma | G06Q 10/04 706/45 |
| 2012/0316807 A1* | 12/2012 | Madrazo | G01D 4/002 702/61 |
| 2014/0058572 A1* | 2/2014 | Stein | G06Q 50/06 700/291 |
| 2015/0331023 A1* | 11/2015 | Hwang | G06Q 10/04 702/60 |
| 2017/0186107 A1* | 6/2017 | Golden | G06Q 50/06 |

* cited by examiner

*Primary Examiner* — Philip Wang

(57) ABSTRACT

Embodiments include methods and systems for forecasting electrical demand of a building. Aspects include receiving a weather forecast for an upcoming day and receiving a historical data file comprising historical weather data and historical electrical load data for the building for a plurality of previous days. Aspects also include comparing the historical weather data for each of the plurality of previous days to the forecast and calculating a baseline electrical consumption of the building for the upcoming day based on the comparison.

10 Claims, 3 Drawing Sheets

WEATHER PATTERN BASED ELECTRICAL DEMAND FORECASTING FOR A BUILDING

BACKGROUND

The present disclosure generally relates to electrical demand forecasting for a building, and more specifically, to weather pattern based electrical demand forecasting for a building.

In general, the electrical load of a building is highly dynamic and it can oscillate within a wide range of values during the course of a day. This oscillation is caused by several factors that influence electricity demand patterns. In order to accurately forecast and control electricity demands for a building, or a cluster of buildings, all these factors and their impacts on energy consumption dynamics need to be considered. However, a complete model of all possible factors is not practically attainable due to unknown dynamical variables, lack of tools to measure their effects, and the fact that some of these variables are uncontrollable or unpredictable.

There are several known approaches for electrical demand forecasting for a building. Many of the known approaches require a large amount of historical data for training. In addition, the existing approaches can be time consuming and as such not suitable for creating a forecast in a short period of time. Current forecasting approaches use training based methods, such as regression, which require large amount of historical data. As a result, the accuracy of forecast is dependent on the availability of large amount of detailed data.

SUMMARY

In accordance with an embodiment, a method for forecasting electrical demand of a building is provided. The method includes receiving a weather forecast for an upcoming day and receiving a historical data file comprising historical weather data and historical electrical load data for the building for a plurality of previous days. The method also includes comparing the historical weather data for each of the plurality of previous days to the forecast and calculating a baseline electrical consumption of the building for the upcoming day based on the comparison.

In accordance with another embodiment, an electrical demand forecasting system includes a processor in communication with a memory. The processor is configured to receive a weather forecast for an upcoming day and to receive a historical data file comprising historical weather data and historical electrical load data for the building for a plurality of previous days. The processor is also configured to compare the historical weather data for each of the plurality of previous days to the forecast and calculate a baseline electrical consumption of the building for the upcoming day based on the comparison.

In accordance with a further embodiment, a method for forecasting demand of a variable parameter is provided. The method includes receiving a forecast for a series of influence factors for an upcoming time period and receiving a historical data file comprising historical data for the series of influence factors and historical data for the variable parameter for a plurality of time periods. The method also includes comparing the historical data for the series of influence factors for each of the plurality of time periods to the forecast for the series of influence factors for the upcoming time period and calculating an estimate of the variable parameter for the upcoming time period based on the comparison.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for electrical demand forecasting for a building are provided. Exemplary embodiments include forecasting a demand for an unknown variable, such as electrical demand for a building, based on a forecast of a set of influence factors and a set of historical data that includes historical data of the unknown variable and historical data for the set of influence factors. In exemplary embodiments, the unknown variable and influence factors include a time series of information. For example, the unknown variable may be electrical load of the building throughout a day, which includes data in five, ten or thirty minute increments. Likewise, the set of influence factors may be various weather metrics, both forecasted and historical, for the same increments of a day. Embodiments include forecasting the electrical demand for a building, or a group of buildings. In general, the electrical demand variation for a building is closely tied with the HVAC load of the building, which in turn is dependent on the weather patterns of the geographical region where the building is located. Although this disclosure generally refers to this specific embodiment, it will be apparent to those of ordinary skill in the art that the methods taught herein can be used to forecast any unknown variable based on a set of influence factors.

Figure 1:
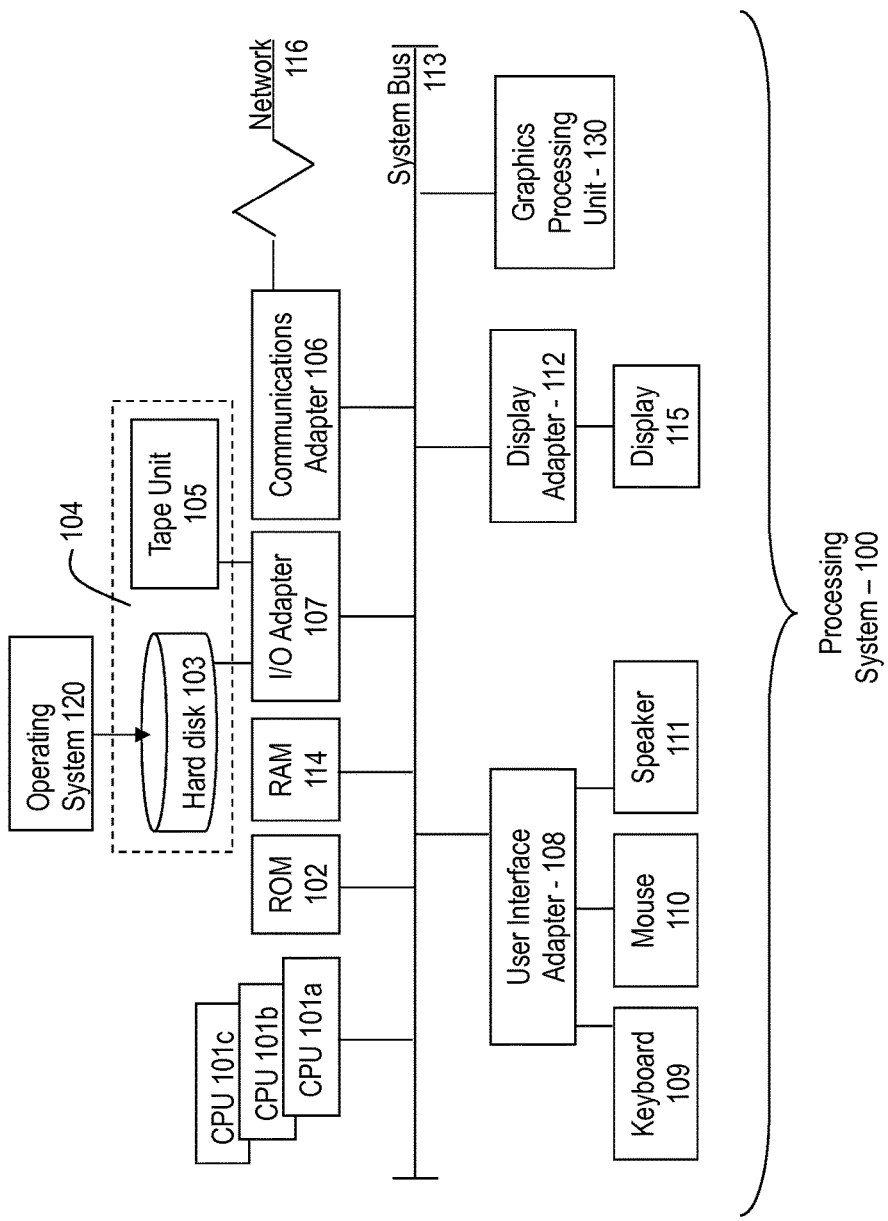
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104.

Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

In exemplary embodiments, the electrical load of a building for a future day is determined based on the weather forecast for that day, historical weather data (temperature, humidity, and wind speed), and historical electrical load data for the building. In exemplary embodiments, the electrical load forecast can be used as the expected baseline electrical consumption for that day. The electrical load forecast can be adjusted based on demand response events to achieve a more accurate prediction of the baseline electrical load demand throughout the day.

Figure 2:
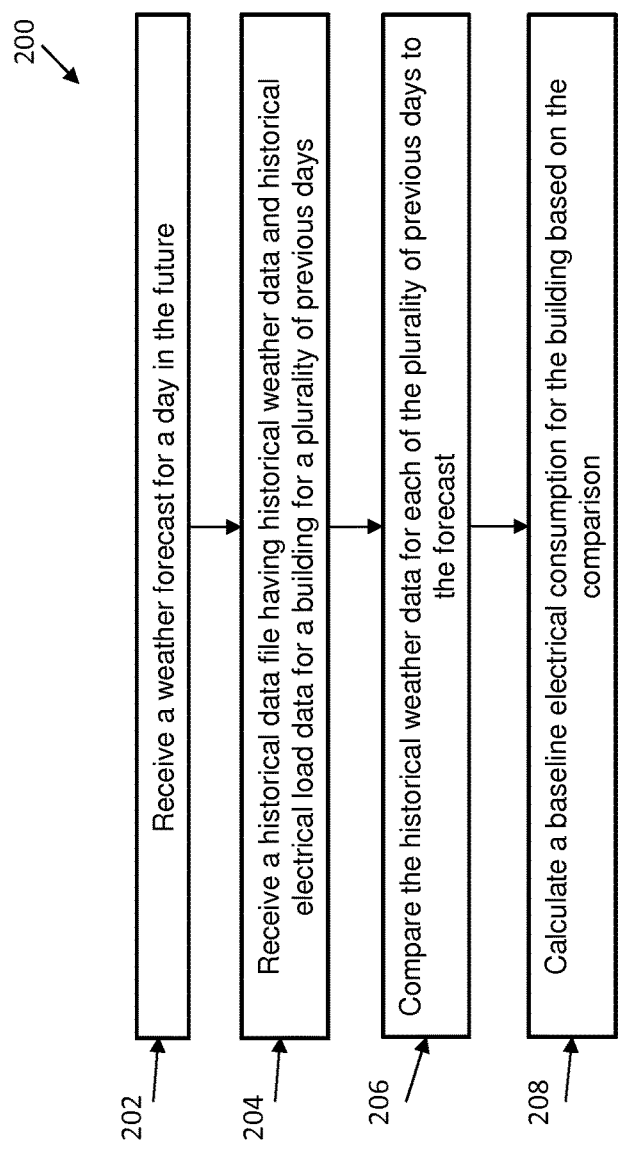
FIG. 2 is a flow diagram illustrating a method for electrical demand forecasting for a building in accordance with an exemplary embodiment.

Referring now to FIG. 2, a flow diagram of a method 200 for electrical demand forecasting for a building in accordance with an exemplary embodiment is shown. As shown at block 202, the method 200 includes receiving a weather forecast for an upcoming day. In exemplary embodiments, the weather forecast may be received from a variety of sources which include, but are not limited to, the National Weather Service, an online commercially available forecast, or the like. In exemplary embodiments, the weather forecast includes a temperature forecast, a humidity forecast and a wind forecast for each of plurality of intervals during a day. The intervals may be hourly, every half hour, every fifteen minutes, or the like. Next, as shown at block 204, the method includes receiving a historical data file that includes both historical weather data and historical electrical load data for the building for a plurality of previous days. In exemplary embodiments, the historical data file includes weather data, including temperature, humidity, and wind data, and electrical load data for multiple days and the data for each day has been divided into a plurality of intervals. The intervals may be hourly, every half hour, every fifteen minutes, or the like.

As shown at block 206, the method 200 also includes comparing the historical weather data for each of the plurality of previous days to the weather forecast. In exemplary embodiments, this comparison may include performing a comparison of the historical weather data to the weather forecast for each corresponding interval and calculating an overall comparison. Next, as shown at block 208, the method 200 includes calculating a baseline electrical consumption of the building for the upcoming day based on the comparison of the historical weather data to the weather forecast.

In exemplary embodiments, the comparison of the historical weather data for each of the plurality of previous days to the weather forecast includes comparing multiple weather metrics, such as temperature (T), wind speed (WS), and humidity (H), for each interval of each of the plurality of previous days to the forecasted data. In one embodiment, for a given interval the absolute difference (%) between each weather metric for each day is calculated by:

$$E_X = \frac{|X_{forecasted} - X_{actual}|}{X_{actual}} \times 100.$$

Next, the comparison includes computing a total percentage difference over a day and then calculating the average difference for an interval $E_x$. These steps are repeated for each of the available weather metrics. In exemplary embodiments, correlation coefficients, such as Pearson correlation coefficients, are calculated between the historical electrical load (L) and the various weather metrics, $C(L, E_T)$, $C(L, E_H)$ and $C(L, E_{WS})$, respectively using the equation below:

$$C_{x,y} = \frac{\sum_{i=1}^{n}(x_i - \bar{x}) \cdot (y_i - \bar{y})}{\sqrt{\sum_{i=1}^{n}(x_i - \bar{x})^2 \cdot \sum_{i=1}^{n}(y_i - \bar{y})^2}}.$$

In exemplary embodiments, once the correlation coefficients have been calculated for each of the weather metrics, individual influence factors are calculated for each weather metric, for example, the influence factor for temperature can be calculated by the following equation:

$$I_T = \frac{C_{L,T}}{C_{L,T} + C_{L,H} + C_{L,WS}}$$

In exemplary embodiments, a weighted error (Err) for each of the plurality of days for which there is historical date can be calculated by:

$$Err = I_T \cdot E_T + I_H \cdot E_H + I_{WS} \cdot E_{WS}$$

Once the weighted error for each of the plurality of days has been calculated, the plurality of days can be arranged in ascending order of the weighted error Err and the top N days can be selected. In exemplary embodiments, N can be selected to be fixed number of days, a fixed percentage of the available previous days, or days that have a weighted error that falls above a threshold value.

In exemplary embodiments, calculating a baseline electrical consumption of the building for the upcoming day based on the comparison includes selecting historical electrical load data $L_i$ for each interval i for the top N days and computing the baseline load using the equation below, where higher weight is given to the closer match.

$$L_b = \sum_{i=1}^{N} \frac{2(N-i+1)}{N(N+1)} \cdot L_i$$

This results in a baseline electrical consumption for the upcoming day ($L_b$).

In exemplary embodiments, factors other than weather factors can have an impact on the electrical consumption for a building. Demand Response (DR) events are changes in electric usage by end-use customers from their normal consumption patterns in response to changes in the price of electricity over time, or to incentive payments designed to induce lower electricity use at times of high wholesale market prices or when system reliability is jeopardized. Demand response activities are actions voluntarily taken by a consumer to adjust the amount or timing of his energy consumption. Demand response actions are generally taken in response to a demand response signal (e.g. energy price, or government and/or utility incentive). In exemplary embodiments, demand responses can involve curtailing power used or by starting on-site generation which may or may not be connected in parallel with the grid.

In exemplary embodiments, a DR signal that indicates an upcoming DR event can be received shortly before the occurrence of a DR event, such as 15 minutes before the event. In such cases, control actions for the electrical system of the building need to be quickly determined to provide an appropriate response to the DR event. In order to determine optimal control action, a forecast of electrical load demand for next few hours is generally required.

In exemplary embodiments, the baseline electrical consumption for the upcoming day ($L_b$) can be corrected, or adjusted, based on demand response signals received. In exemplary embodiments, after a DR signal is received, but before the occurrence of the DR event, the actual average electrical load consumption for past "n" intervals ($\overline{E}_{actual}$) is calculated. The number of n past intervals can be determined based on the length of the intervals, the duration of the demand response event, or upon other relevant factors. Next, baseline average electrical load consumption for same "n" intervals ($\overline{E}_{baseline}$) is calculated based on the previously determined baseline electrical consumption for the upcoming day ($L_b$). Once both the baseline average electrical load consumption and the actual average electrical load consumption, the ratio between actual and baseline average load consumption for "n" intervals is calculated by:

$$R = \overline{E}_{actual} / \overline{E}_{baseline}.$$

In exemplary embodiments, in order to adjust the baseline electrical load demand based on demand response events to achieve a more accurate prediction of the electrical load demand of the building, the ratio between actual and baseline average load consumption R is multiplied by the baseline values $L_b$ at each interval for demand response event duration.

Figure 3:
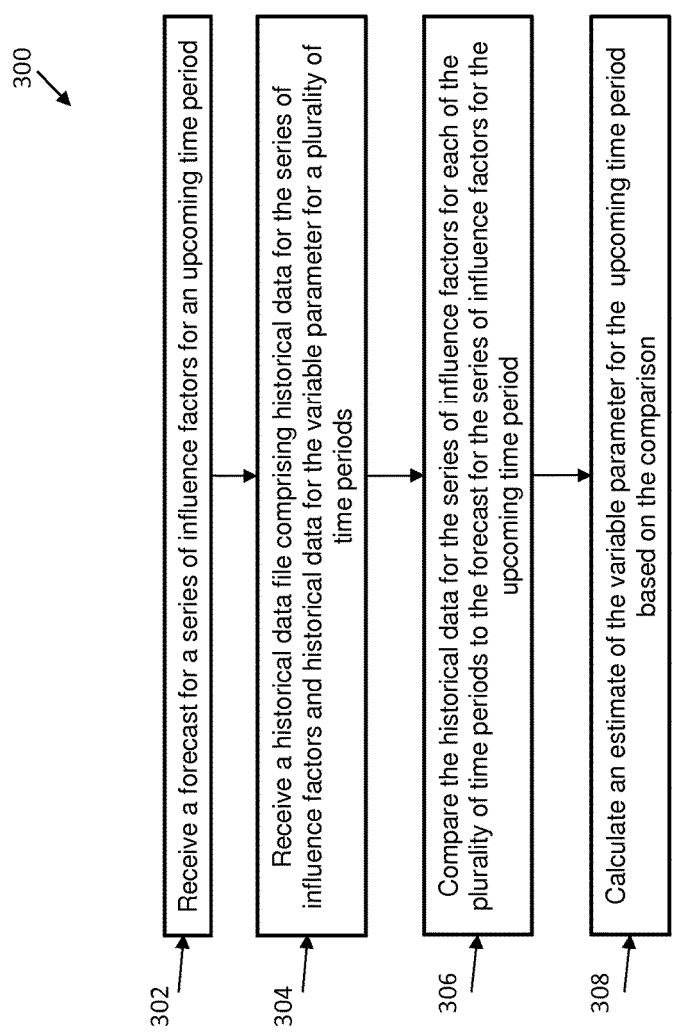
FIG. 3 is a flow diagram of a method for forecasting demand of a variable parameter in accordance with an exemplary embodiment.

Referring now to FIG. 3, a flow diagram of a method 300 for forecasting demand of a variable parameter in accordance with an exemplary embodiment is shown. As shown at block 302, the method 300 includes receiving a forecast for a series of influence factors for an upcoming time period. Next, as shown at block 304, the method 300 includes receiving a historical data file comprising historical data for the series of influence factors and historical data for the variable parameter for a plurality of time periods. The method 300 also includes comparing the historical data for the series of influence factors for each of the plurality of time periods to the forecast for the series of influence factors for the upcoming time period, as shown at block 306. Next, as shown at block 308, the method 300 includes calculating an estimate of the variable parameter for the upcoming time period based on the comparison.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer based method for forecasting electrical demand of a building for short response to an upcoming demand response event, the method comprising:
    receiving a weather forecast for a demand response event of an upcoming day;
    receiving a historical data file comprising historical weather data and historical electrical load consumption data for the building for a plurality of previous days;
    ranking N days of historical weather data as best matching the weather forecast, comprising:
        comparing, by a processor, the historical weather data for each of the plurality of previous days to the weather forecast, wherein the comparing includes calculating an average difference between at least one weather metric for one day of the historical weather data and the at least one weather metric for the weather forecast for a plurality of n time intervals;
        calculating correlation coefficients for historical load consumption data and the at least one weather metric;
        calculating a weighted error for each of the plurality of previous days using the average difference and the correlation coefficients; and
        determining N days having the least calculated error; and
    calculating, by the processor, a baseline electrical load consumption forecast of the building for the upcoming day based on the historical electrical load consumption data of the N days comparison;
    calculating, by the processor, a ratio of an average electrical load consumption of the building for a past number n of time intervals and an average baseline electrical load consumption for the past number n of time intervals; and
    determining the electrical load demand forecast by adjusting the baseline electrical load consumption by the ratio.

2. The method of claim 1, wherein the comparing includes calculating, for each of n time intervals, an absolute difference of a first weather metric between a first forecasted weather metric of the weather forecast and a first historical weather metric of the historical weather data for one of the plurality of previous days.

3. The method of claim 1, wherein calculating the weighted error comprises calculating a first influence factor between the historical electrical load and a first weather metric and a second influence factor between the historical electrical load and a second weather metric.

4. The method of claim 3, wherein calculating the consumption weighted error comprises calculating weighted error for each of the plurality of previous days based on the first influence factor and the second influence factor.

5. The method of claim 1, wherein the determining electrical load demand is performed in response to receiving a demand response signal prior to the demand response event.

6. The method of claim 5, wherein the demand response signal is received within 15 minutes before an occurrence of the demand response event.

7. An electrical demand forecasting system comprising:
a processor in communication with one or more types of memory, the processor configured to:
receive a weather forecast for a demand response event of an upcoming day;
receive a historical data file comprising historical weather data and historical electrical load consumption data for the building a plurality of previous days;
rank N days of historical weather data as best matching the weather forecast, comprising:
compare the historical weather data for each of the plurality of previous days to weather the forecast, wherein the comparing includes calculating an average difference between at least one weather metric for one day of the historical weather data and the at least one weather metric for the weather forecast for a plurality of n time intervals;
calculate correlation coefficients for historical load consumption data and the at least one weather metric;
calculate a weighted error for each of the plurality of previous days using the average difference and the correlation coefficients; and
determine N days having the least calculated error; and
calculate a baseline electrical load consumption forecast of the building for the upcoming day based on the historical electrical load consumption data of the N days comparison
calculate a ratio of an average electrical load consumption or the building for a past number n of time intervals and an average baseline electrical load consumption for the past number n of time intervals; and
determine the electrical load demand forecast by adjusting the baseline electrical load consumption by the ratio.

8. The electrical demand forecasting system of claim 7, wherein the comparing includes calculating, for each of n time intervals, an absolute difference of a first weather metric intervals between a first forecasted weather metric of the weather forecast and a first historical weather metric of the historical weather data for one of the plurality of previous days.

9. The electrical demand forecasting system of claim 7, wherein calculating the baseline electrical weighted error comprises calculating a first influence factor between the historical electrical load and a first weather metric and a second influence factor between the historical electrical load and a second weather metric.

10. The electrical demand forecasting system of claim 9, wherein calculating the electrical weighted error further comprises calculating weighted error for each of the plurality of previous days based on the first influence factor and the second influence factor.

* * * * *